April 28, 1925.

A. W. BREIDING

OIL BURNER

Filed July 30, 1923

Inventor:
Albert W. Breiding

April 28, 1925.

A. W. BREIDING

OIL BURNER

Filed July 30, 1923

Inventor:
Albert W. Breiding,
By Dyrenforth, Lee, Chritton & Wiles
Attys.

Patented Apr. 28, 1925.

1,535,710

UNITED STATES PATENT OFFICE.

ALBERT W. BREIDING, OF STERLING, ILLINOIS.

OIL BURNER.

Application filed July 30, 1923. Serial No. 654,666.

*To all whom it may concern:*

Be it known that I, ALBERT W. BREIDING, a citizen of the United States, residing at Sterling, in the county of Whiteside and State of Illinois, have invented a new and useful Improvement in Oil Burners, of which the following is a specification.

This invention relates to oil burners and is particularly adapted to be used in stoves, furnaces and the like for house heating. The invention is fully described in the following specification and shown in the accompanying drawings, in which, Fig. 1 is a top plan view of a burner embodying the invention, as viewed on the line 1—1 of Fig. 2;

Figure 1:
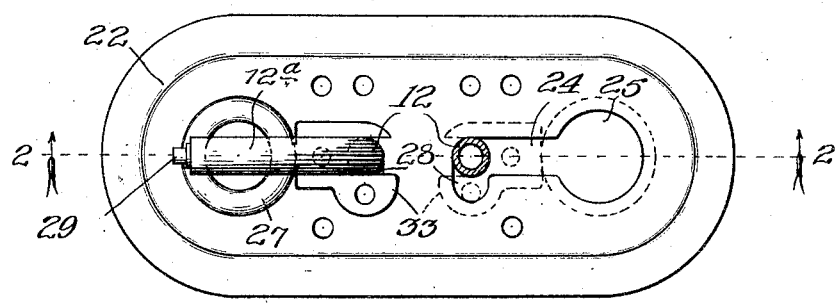

The device as illustrated comprises a support 10 having two opposed longitudinal slots 11 through which the oil pipes 12 may be moved. The lower end of the oil pipe 12 is threaded and screwed into a hollow block 13 which has an ear 14 which is secured to the support 10 by means of bolts 15.

Figure 2:
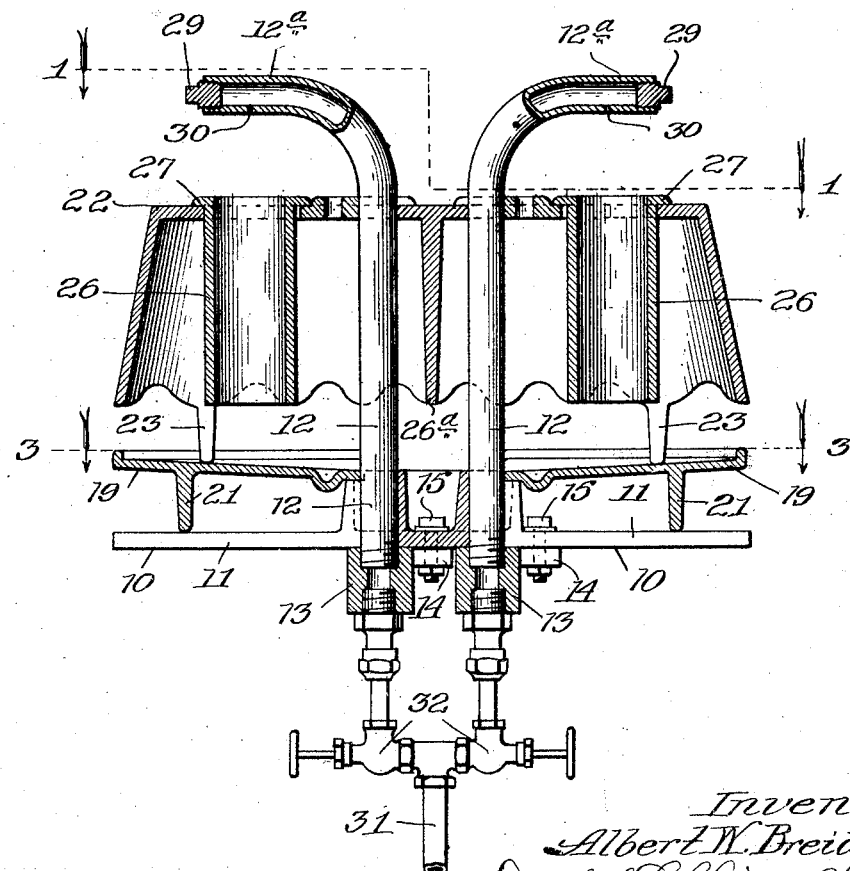
Fig. 2 is a vertical longitudinal section on the line 2—2 of Fig. 1.
Figure 3:
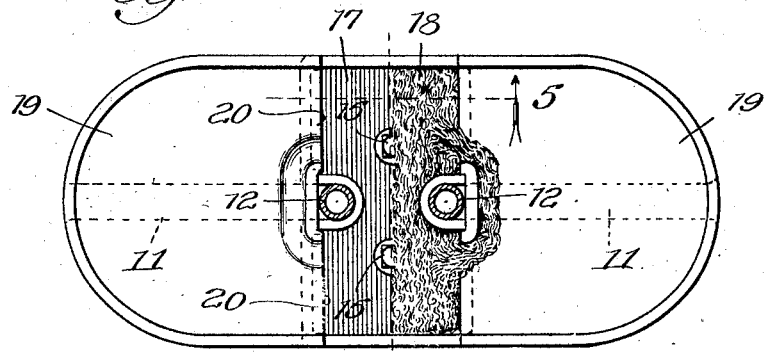
Fig. 3 is a plan view on the line 3 of Fig. 2.
Figure 4:
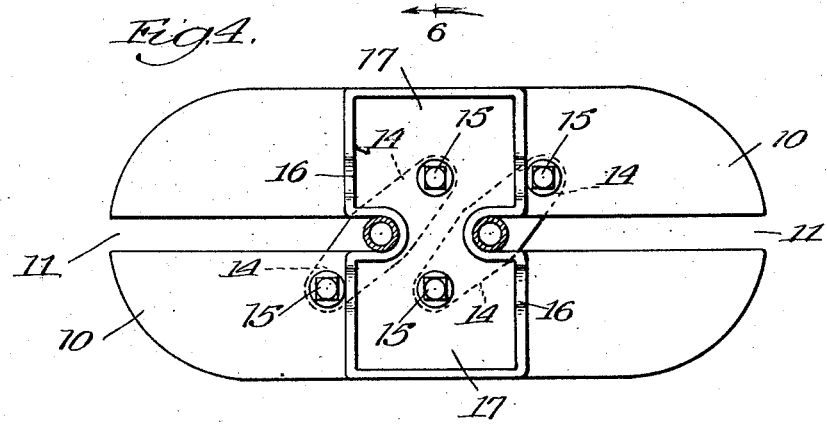
Fig. 4 is the same with the plates removed.
Figure 5:
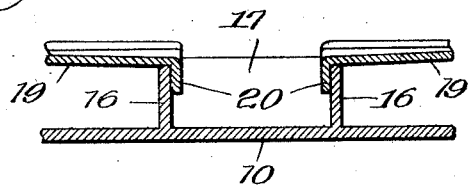
Fig. 5 is a partial section on the line 5 of Fig. 3.
Figure 6:
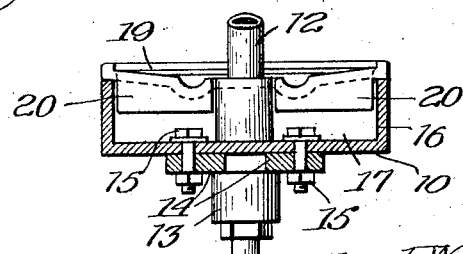
Fig. 6 is a vertical section on the line 6 of Fig. 3.

The upper surface of the support 10 has a vertical wall 16, which surrounds a depression or sump 17 adapted to hold fuel oil for a purpose which will later be explained and which is preferably filled with a non-combustible material 18, as shown in Fig. 3. A removable plate 19 has a lip 20 which overlaps the side walls 16 and has a foot 21 (Fig. 2) which rests upon the support 10. One of these plates is preferably provided for each of the oil pipes 12.

In the preferred form of double burner shown, the two plates 19 serve as a support for the hollow dome 22 which has legs 23 which stand upon the plates 19. This dome has a substantially flat top in which are formed slots 24, adapted to receive the oil pipes 12. These slots project outwardly from the oil pipes and terminate in enlarged openings 25 in which are loosely fitted tubes 26, which have flanges 27 at their upper ends, by which the tubes are supported within the dome. The slots 24 have lateral enlargements 28, which permit the dome to be shifted sidewise for the purpose of assembling and disassembling the parts as will later be explained. The oil pipes 12 preferably terminate in curved ends 12ª, which are turned so as to overlie the tubes 26. The ends of these tubes are closed by means of plugs 29 and each tube is provided with an orifice 30, which lies immediately over the center of its tube 26.

The method of operation of the burner is as follows:

Oil is conducted to the burner from a suitable source, not shown, which is under pressure through a pipe 31 and is led through a controlling valve 32 to the oil pipe 12. The valve 32 is first opened so as to permit oil to be forced through the orifice 30 through the tube 26 to the plate 19. Owing to the fact that this plate slopes toward the sump 17, oil will flow thereto. This oil which impregnates the asbestos 18 is ignited and the heat generated thereby heats the dome 22 and the vertical section of the pipe 12. When from the operator's experience he deems that the burner is heated sufficiently to cause it to generate, he slowly opens the valve 32 when the gasified oil will be forced through the orifice 30 into the tube 26. As this stream of gasified oil is projected into the tube 26, it will carry with it a large quantity of air which will mix with the gasified oil and the two will burn in the tube 26 and within the dome 22, the products of combustion being forced out around the bottom of the dome 22. Either of the pipes 12 may be used alone, or both may be caused to operate at the same time. After one has been in operation for a little while it will heat the other pipe so as to cause it to begin generating as soon as its controlling valve 32 is opened.

To disassemble the burner the small cap 33 is removed, thereby permitting the dome 22 to be moved over until the pipes 12 occupy the lateral enlargements 28. The ends 12ª of the pipe will then be carried sufficiently to one side to permit the tubes 26 to be withdrawn, when the dome 22 can be lifted bodily, the tubes 12 passing through the enlargements 25. The plates 19 can then be lifted off the support 10 and the blocks 13 separated therefrom by removing the screws 15.

The oil burner here shown is adapted particularly for use in stoves for heating a room and while two burners are shown, one only may be used, or three, four or more may be grouped together. When a plurality is used, adjacent burners should be separated by a partition 22ª. This is of service when only one jet is burned as it aids greatly in muffling the noise.

The slots 11 serve also to supply air to the burners, the plate 10 being loosely surrounded by the bottom of the furnace so that air can enter around the sides of the plate 10.

While I have shown and described but a single embodiment of my application, it is to be understood that it is capable of many modifications. Changes, therefore, in the construction and arrangement may be made which do not depart from the spirit and scope of the appended claims, in which it is my intention to cover all novelty inherent in the invention as broadly as possible in view of the prior art.

I claim:

1. An oil burner comprising a hollow dome open at the bottom, a tube extending downwardly from the top of the dome, an oil pipe passing through said dome and having an orifice discharging downwardly into said tube, means for controlling the flow of fuel through said orifice, and a plate held some distance below the bottom of said dome, said dome resting upon said plate and having an opening through which said tube and oil pipe pass, said tube being removable therefrom to permit said oil pipe to pass through the opening.

2. An oil burner comprising a support, a plurality of oil pipes rising therefrom, an oil sump in said support adjacent to said pipes, a removable plate carried by said support and adapted to drain into said sump, a hollow dome carried by said plate and passing over said pipes, vertically disposed tubes carried by said dome, orifices in said pipes adapted to discharge into said tubes, and means for controlling the flow of oil through said orifice, said sump serving as a reservoir for unburned oil passing through said tubes.

3. An oil burner comprising a support, a plurality of oil pipes rising therefrom, an oil sump in said support adjacent to said pipes, a removable plate carried by said support and adapted to drain into said sump, a hollow dome carried by said plate and passing over said pipes, vertically disposed tubes carried by said dome, orifices in said pipes adapted to discharge into said tubes, and means for controlling the flow of oil through said orifice, said sump serving as a reservoir for unburned oil passing through said tubes, said tubes being removable to permit said dome to be lifted from said oil pipes.

4. An oil burner comprising a support, a plurality of oil pipes rising therefrom, an oil sump in said support adjacent to said pipes, a removable plate carried by said support and adapted to drain into said sump, a hollow dome carried by said plate and passing over said pipes, vertically disposed tubes carried by said dome, orifices in said pipes adapted to discharge into said tubes, and means for controlling the flow of oil through said orifice, said sump serving as a reservoir for unburned oil passing through said tubes.

ALBERT W. BREIDING.